US009215539B2

(12) United States Patent
Kim et al.

(10) Patent No.: US 9,215,539 B2
(45) Date of Patent: Dec. 15, 2015

(54) SOUND DATA IDENTIFICATION

(71) Applicant: Adobe Systems Incorporated, San Jose, CA (US)

(72) Inventors: Minje Kim, Savoy, IL (US); Paris Smaragdis, Urbana, IL (US)

(73) Assignee: Adobe Systems Incorporated, San Jose, CA (US)

(*) Notice: Subject to any disclaimer, the term of this patent is extended or adjusted under 35 U.S.C. 154(b) by 518 days.

(21) Appl. No.: 13/680,334

(22) Filed: Nov. 19, 2012

(65) Prior Publication Data

US 2014/0140517 A1 May 22, 2014

(51) Int. Cl.

| | |
|---|---|
| ***G06F 17/00*** | (2006.01) |
| ***H04R 29/00*** | (2006.01) |
| ***G10L 25/51*** | (2013.01) |
| ***G10L 21/0208*** | (2013.01) |
| *G10L 21/0216* | (2013.01) |

(52) U.S. Cl.

CPC ............ *H04R 29/00* (2013.01); *G10L 21/0208* (2013.01); *G10L 25/51* (2013.01); *G10L 2021/02161* (2013.01)

(58) Field of Classification Search

CPC ................... G06F 17/30743; G10H 2210/031; G10H 2210/056; G10H 2210/141; G10H 2240/131; G10H 2240/141

See application file for complete search history.

(56) References Cited

U.S. PATENT DOCUMENTS

| | | | | |
|---|---|---|---|---|
| 7,277,692 | B1 * | 10/2007 | Jones et al. | 455/412.1 |
| 8,487,176 | B1 * | 7/2013 | Wieder | 84/615 |
| 2005/0042591 | A1 * | 2/2005 | Bloom et al. | 434/307 A |
| 2009/0132077 | A1 * | 5/2009 | Fujihara et al. | 700/94 |
| 2009/0279715 | A1 * | 11/2009 | Jeong et al. | 381/92 |
| 2011/0054848 | A1 | 3/2011 | Kim et al. | |
| 2013/0121511 | A1 * | 5/2013 | Smaragdis et al. | 381/119 |
| 2013/0176438 | A1 * | 7/2013 | Mate et al. | 348/157 |
| 2013/0297053 | A1 * | 11/2013 | Ojanpera | 700/94 |
| 2013/0297054 | A1 * | 11/2013 | Ojanpera | 700/94 |

OTHER PUBLICATIONS

Bryan, Nicholas J., et al., "Clustering and Synchronizing Multi-Camera Video Via Landmark Cross-Correlation", *In Proceedings of the IEEE International Conference on Acoustics, Speech and Signal Processing*, Kyoto, Japan. Mar. 2012., 4 pages.

Raj, Bhiksha et al., "Latent Variable Decomposition of Spectrograms for Single Channel Speaker Separation", *In Proceedings of the IEEE Workshop on Applications of Signal Processing to Audio and Acoustics*, New Paltz, NY, Oct. 2005., 6 pages.

* cited by examiner

*Primary Examiner* — Andrew C Flanders
(74) *Attorney, Agent, or Firm* — Wolfe-SBMC

(57) ABSTRACT

Sound data identification techniques are described. In one or more implementations, common sound data and uncommon sound data are identified from a plurality of sound data from a plurality of recordings of an audio source using a collaborative technique. The identification may include recognition of spectral and temporal aspects of the plurality of the sound data from the plurality of the recordings and sharing of the recognized spectral and temporal aspects to identify the common sound data as common to the plurality of recordings and the uncommon sound data as not common to the plurality of recordings.

20 Claims, 8 Drawing Sheets

SOUND DATA IDENTIFICATION

BACKGROUND

Users have access to a variety of different devices with which the user may capture sound, such as mobile phones, tablet computers, portable game devices, and so on. During this capture, however, artifacts may also be captured that interfere with sound from a desired source, such as noise from an audience during a concert, mechanical sounds made by the device during a lecture, and so on.

Techniques were developed in which sound data having a lower quality may be replaced with sound data having a higher quality. However, in some instances the higher quality sound data may also include artifacts. Consequently, users were forced to choose between sources when using these conventional techniques and thus were still faced with inclusion of the artifacts in the sound data.

SUMMARY

Sound data identification techniques are described. In one or more implementations, common sound data and uncommon sound data are identified from a plurality of sound data from a plurality of recordings of an audio source using a collaborative technique. The identification may include recognition of spectral and temporal aspects of the plurality of the sound data from the plurality of the recordings and sharing of the recognized spectral and temporal aspects to identify the common sound data as common to the plurality of recordings and the uncommon sound data as not common to the plurality of recordings.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Sound alignment techniques were developed to replace sound data from one source with sound data from another source, which may be used to support a variety of different functionality, such as to remove noise, generate a foreign overdub, remove foul language, and so on. However, conventional techniques that were employed to perform this alignment could still include artifacts that interfere with sound data from a desired source, such as when higher quality sound data that is to be used to replace lower quality sound data also includes artifacts.

Sound data identification techniques are described. In one or more implementations, sound data from multiple recordings is processed to identify which audio components are common and which audio components are uncommon. The sound data for the common audio components may then be used to generate a "clean" version of the multiple recordings, which may include discarding or reducing an effect of the uncommon audio components. A variety of other examples are also contemplated, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
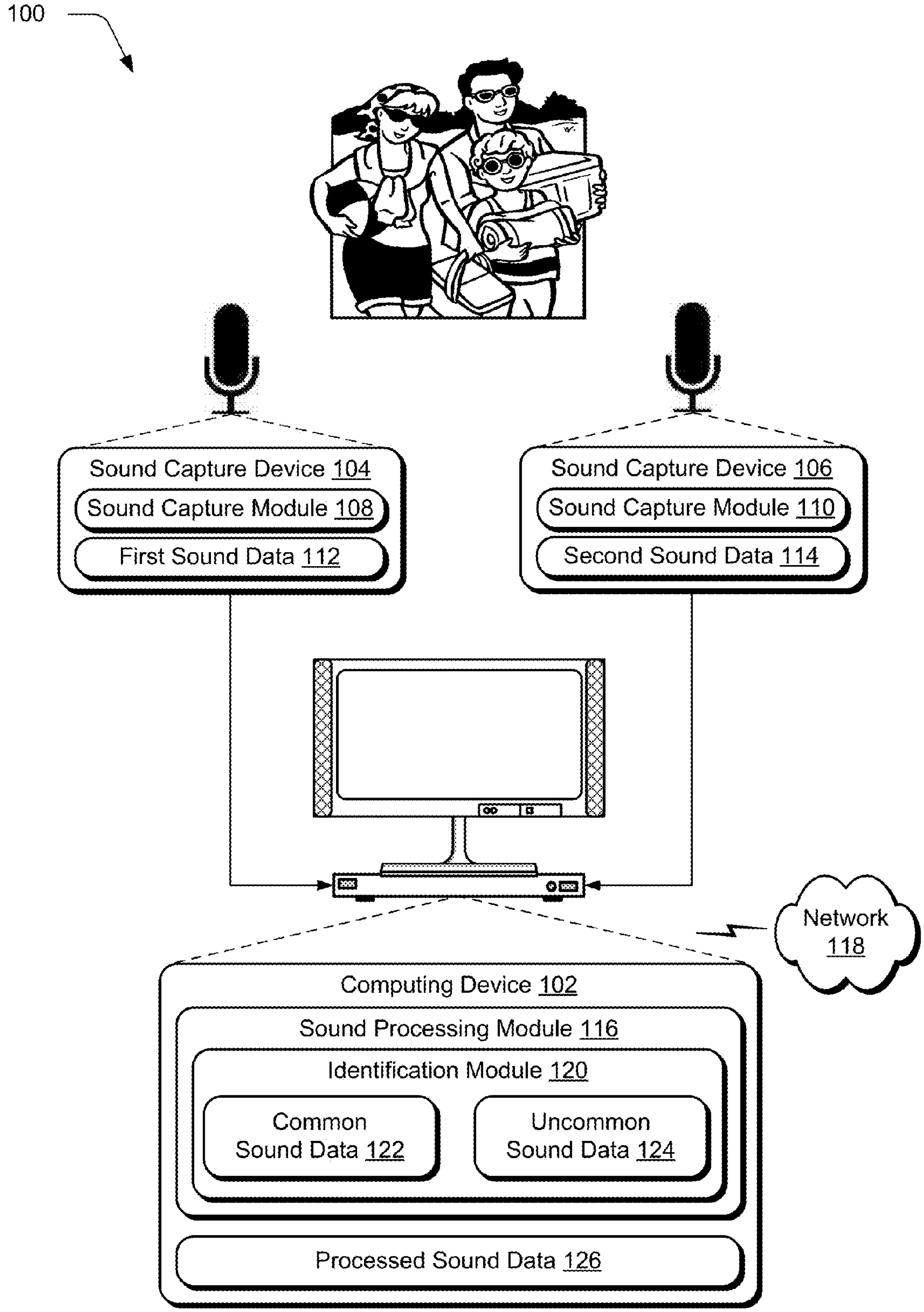
FIG. 1 is an illustration of an environment in an example implementation that is operable to perform identification techniques described herein.

FIG. 1 is an illustration of an environment 100 in an example implementation that is operable to employ the identification techniques described herein. The illustrated environment 100 includes a computing device 102 and sound capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 8.

The sound capture devices 104, 106 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture devices 104, 106 are illustrated separately from the computing device 102, the sound capture devices 104, 106 may be configured as part of the computing device 102, a single sound capture device may be utilized in each instance, and so on.

The sound capture devices 104, 106 are each illustrated as including respective sound capture modules 108, 110 that are representative of functionality to generate sound data from signals recorded from an audio source, examples of which include first and second sound data 112 captured as part of a video taken of an outdoor scene in the illustration. This data may then be obtained by the computing device 102 for processing by a sound processing module 116. Although illustrated as part of the computing device 102, functionality represented by the sound processing module 116 may be further divided, such as to be performed "over the cloud" via a network 118 connection, further discussion of which may be found in relation to FIG. 8.

As previously described, the pervasiveness of sound capture devices 104, 106 is ever increasing. For example, the number of mobile communication devices such as mobile phones, tablet computers, gaming devices, and so on continues to increase and therefore sound capture devices included on these devices also continues to increase. The sound capture devices may be utilized to record a variety of different types of sound, such as from a recording of audio-visual scenes including concerts, talks, lectors, home video including sound, and so on. However, in some instances sound data generated from these captured signals may have undesirable characteristics, such as interference (e.g., another spectator talking close to the device), noise, disruptions, and so on.

Accordingly, conventional techniques were developed to replace lower-quality sound data with higher-quality sound data. The higher-quality sound data may be aligned to the lower-quality sound data using a variety of techniques, such as to align features (e.g., spectral characteristics) of the sound data. In this way, noise or other interference may be replaced.

However, the sound data from both sources may be contaminated, including instances in which the contamination is encountered in different ways. For example, an audience located close to a sound capture device and even a holder of the sound capture device itself may speak during capture of sound from a concert or lecture. Mechanical noises may also be encountered, such as from movement of a lens, "clicking" of buttons, and so on. Consequently, even though a generally higher-quality version may be available, that recording may still be undesirable using conventional techniques.

Accordingly, the sound processing module 116 may employ an identification module 120, which is representative of collaborative enhancement techniques to identify common sound data 112 from a plurality of sound data, such as the first and second sound data 112, 114 as illustrated. The identification module 120, for instance, may be configured to perform blind source separation (BSS) tasks in which an assumption is made that common sound data 122 in the first and second sound data 112, 114 (e.g., included in both recordings) includes the portions of the sound data that are desirable for output whereas uncommon sound data 124 (e.g., included in either recording but not both) includes noise or other interference. In this way, identification of the common and uncommon sound data 122, 124 through a collaborative technique may be used to generate processed sound data 126 as a "clean version" of the first and second sound data 112, 114.

For example, the identification module 120 may employ techniques to decompose the first and second sound data 112, 114 into three input matrixes. This may be performed by a probabilistic counterpart of NMF, which may be referred to a probabilistic latent component analysis (PLCA). The three input matrixes, for instance, may be used to support tri-factorization (e.g., via symmetric PLCA) and sound probabilistic interpretation of a model. Further, the identification module 120 may support sharing of the matrixes and thereby take advantage of a maximum a posterior (MAP) approach to leverage use of prior knowledge about bases which may be obtained in advance from a "cleaner" recording of signal mixtures. Further discussion of these examples may be found in the following discussion and corresponding figure.

Figure 2:
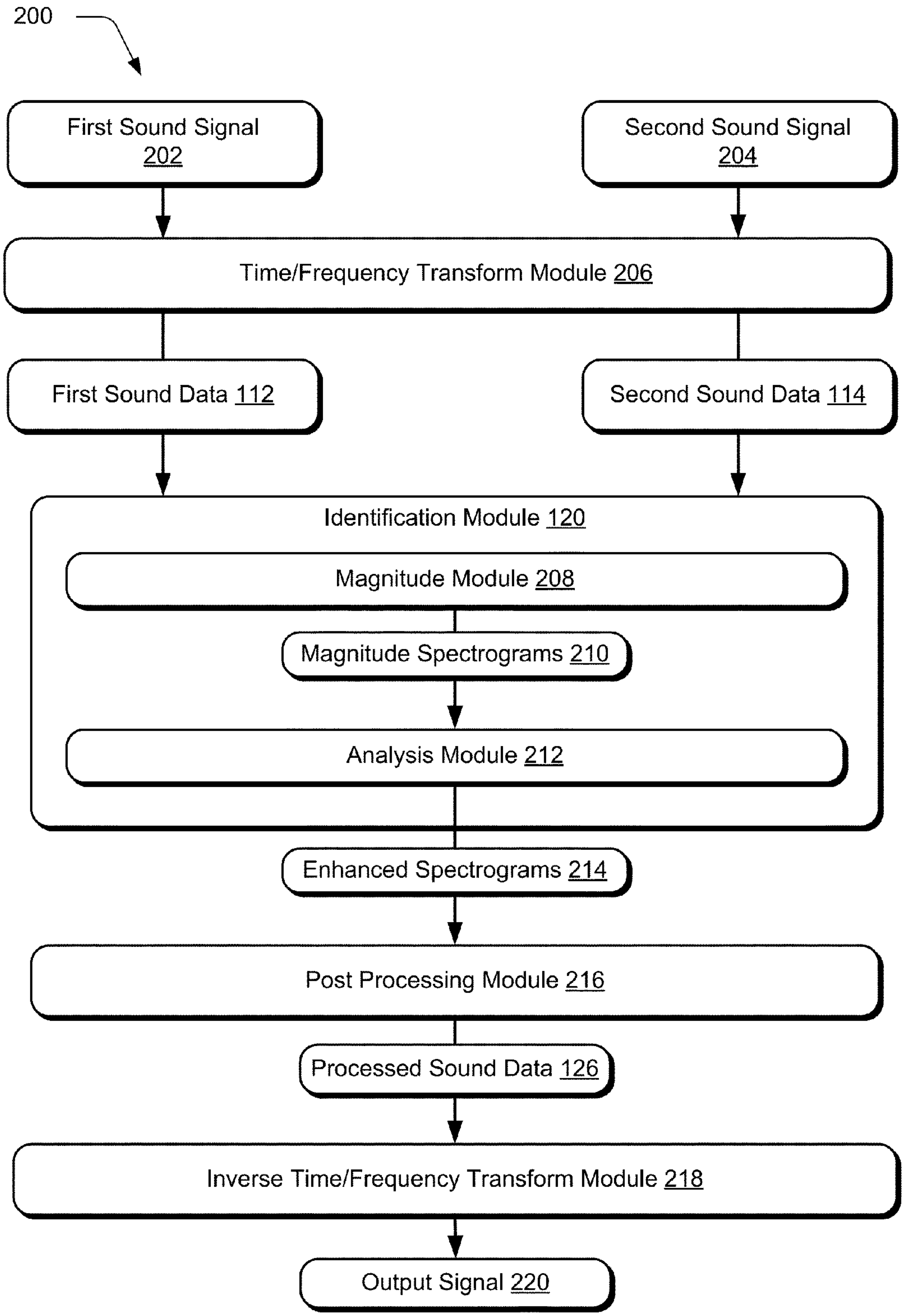
FIG. 2 depicts a system in an example implementation in which processed sound data is generated from first and second sound data from FIG. 1.

FIG. 2 depicts a system 200 in an example implementation in which processed sound data 126 is generated from the first and second sound data 112, 114 from FIG. 1. A first sound signal 202 and a second sound signal 204 are processed by a time/frequency transform module 206 to create the first sound data 112 and second sound data 114, which may be configured in a variety of ways.

The first and second sound data 112, 114, for instance, may be calculated as a time-frequency representation (e.g., spectrogram), such as through a short-time Fourier transform or other time-frequency transformation. This may be used to define input matrices "X(t,f,l)" where "t" and "f" are the index of time and frequency positions, respectively. The recordings index "l" is for the "l-th" recording from "L" total number of recordings in the following discussion.

The first and second sound data 112, 114, may then be received by an identification module 120. The identification module 120 may first employ a magnitude module 208 which is representative of functionality to take absolute values for the input matrices of the first and second sound data 112, 114 to generate magnitude spectrograms 210.

The magnitude spectrograms 210 may then be obtained by an analysis module 212 for processing to identify the common and uncommon sound data 122, 124 from the first and second sound data 112, 114. As previously described, this may support collaborative techniques to improve quality of multiple recordings from an audio scene. For example, the analysis module 212 may employ a branch of probabilistic latent component analysis (PLCA) in which desired sound data may be identified by sharing spectral and temporal aspects of the latent components that represent the source. In this way, collaboration in the analysis of the first and second sound data 112, 114 may be used to identify which portions of the sound data are common or recording specific.

The analysis module 212, for instance, may be configured to conduct PLCA on the input matrices of the magnitude spectrograms 210. However, during part of the PLCA learning process, parameters may be shared across the analyses of the first and second sound data 112, 114. Components that are relevant to the shared parameters as part of this learning process may be used to represent the desired source while the not-shared individual parameters capture the recording-specific interferences, i.e., the common and uncommon sound data 122, 124. This process may continue until convergence is reached, thereby forming enhanced spectrograms 214 as further described below in relation to the "PLCA" section and FIG. 3.

Prior knowledge about the source may also be leveraged by the analysis module 212. For example, the prior knowledge about an audio source may be incorporated in a flexible way to affect the solution even though that knowledge may be obtained from sources that are not exactly the same, e.g., use of a studio recording to obtain prior knowledge for a live event. Further discussion of the use of prior knowledge may be found in the "Prior Knowledge" section below.

Additionally, a post processing module 216 may be employed to perform post processing on an output of the analysis module 212, e.g., the enhanced spectrograms 214.

For example, post processing may be performed to consolidate recording-specific reconstructions (e.g., of the uncommon sound data 124) into a representative matrix. This may include use of a weight vectors taken from the magnitude spectrograms 210. This matrix may then be used with the common sound data 124 to generate processed sound data 126 from the first and second sound signals 202, 204. The processed sound data 126 may then be transformed by an inverse time/frequency transform module 218 to generate an output signal 220 that may be listened to by a user.

In this way, the system 200 may be employed to identify desired audio components, such as music, while discarding interference signals and unwanted artifacts. This may be done in a collaborative way of audio enhancement as the analysis module 212 may process multiple instances of damaged sound data to generate an enhanced version of that data.

PLCA, for instance, may be used to decompose an input matrix into predefined number of components, each of which can be further factorized into a spectral basis vector, a temporal excitation, and a weight for the component. By multiplying those factors, a component of the input matrix may be recovered. As a component is expressed with probability of getting it given the observed time-frequency point, PLCA is used to infer the posterior probability of the component given the magnitude observed at each of the time/frequency positions.

As common sound data 122 shares both frequency and time characteristics, by setting aside some basis vectors and temporal activations and by letting them be the same during the learning process performed by the analysis module 212, the components of the sound data (e.g., the first and second sound data 114) may be grouped into common sound data 122 and uncommon sound data 124 groups, e.g., from common audio sources and recording specific interferences.

PLCA

Figure 3:
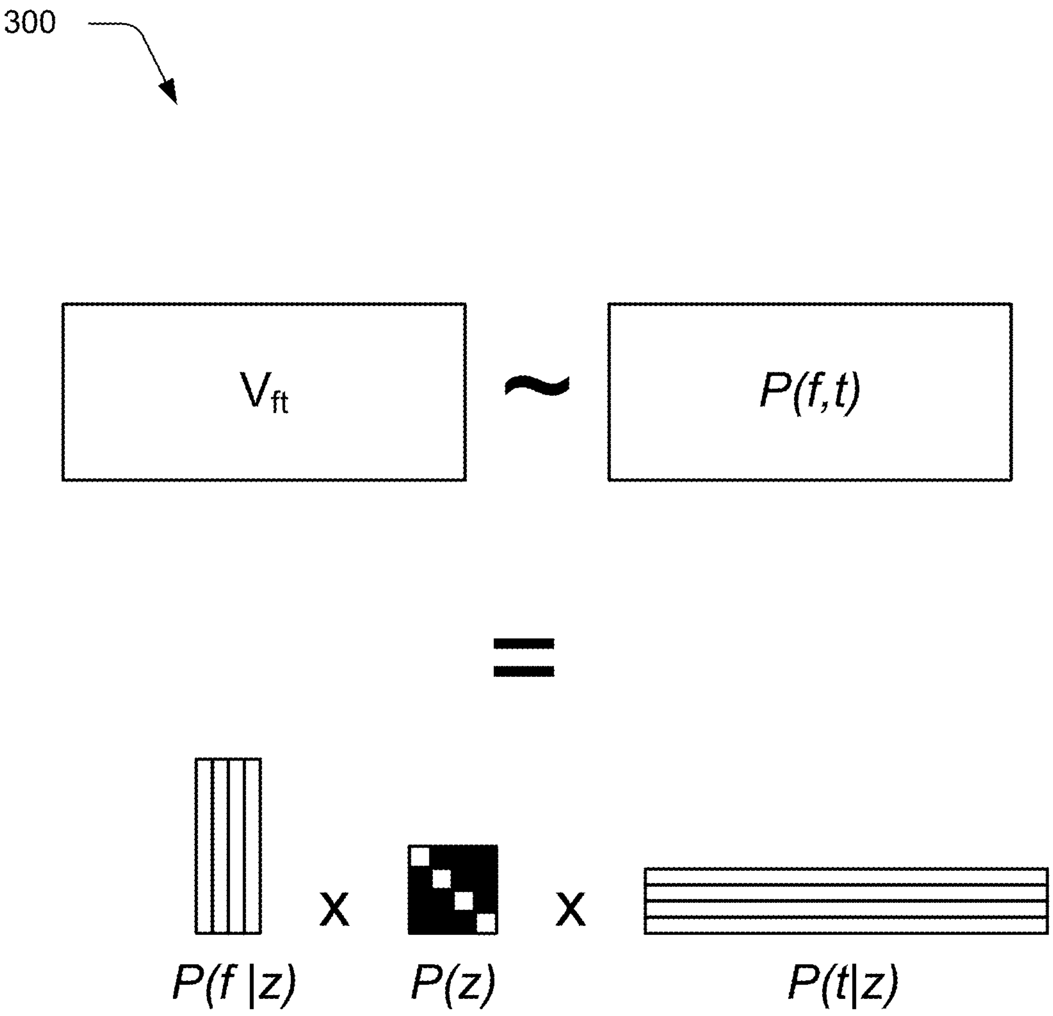
FIG. 3 depicts an example implementation of a pictorial representation of PLCA as applied on an input matrix when there are four components.

FIG. 3 depicts an example implementation 300 of a pictorial representation of PLCA as applied on an input matrix when there are four components. For example, "L" input matrixes may be obtained by the sound processing module 116 from sound data that correspond to magnitudes of short-time Fourier transformed sound signals as described in relation to FIG. 2. Latent variables for "l-th" recording may be categorized into two parts as follows:

$$z^{(l)}=\{z_c, Z_I^{(l)}\}$$

where "$z_c$" is a subset that contains common sound data 112, i.e., source components that are shared across the sound data from each of the sources, and "$Z_I^{(l)}$" contains uncommon sound data 124, i.e., other recording specific components.

An expression may then be built of a log-likelihood of getting "L" recordings in terms of the shared component models as follows:

$$P = \sum_l \sum_{f,t} V_{f,t}^{(l)} \log \left\{ \sum_{z \in z_C} P_C(f \mid z) P_C(t \mid z) P^{(l)}(z) + \sum_{z \in z_I^{(l)}} P_I^{(l)}(f \mid z) P_I^{(l)}(t \mid z) P^{(l)}(z) \right\}$$

It should be noted that "$P^{(l)}(z)$" for each "l" are the same if "$z \in z_c$".

Components of the "l-th" input may be divided into two groups, a shared group "$z_c$" which contains the common sound data 122 and "$Z_I^{(l)}$" which contains uncommon sound data 124 as previously described. A sharing concept may employed in which "$P_c(f|z)$" and "$P_c(t|z)$" are the same across each input in which "$z \in z_c$", even though each component "$z \in z_c$" has a distinctive topic distribution "$P^{(l)}(f,t|z)$", which can be regarded as an underlying distribution where "l-th" input was obtained. Therefore, common variables may be defined as "$P_c(f|z)$" and "$P_c(t|z)$", which refer to common sound data 122.

On the other hand, latent variables in "$Z_I^{(l)}$" represent uncommon sound data 124 (e.g., recording-specific sound components), such as interferences, noise, mechanical noises, and so forth. The latent variables may also have their own individual distributions "$P_I^{(1)}(f|z)$" and "$P_I^{(1)}(t|z)$" if "$z \in Z_I^{(l)}$".

By rearranging notations of latent variables as above, an energy step of PLCS as employed by the analysis module 212 may be defined having a new posterior probability of getting "$z \in z^{(l)}$" conditioned on time and frequency axes as follows:

$$P^{(l)}(z \mid f, t) = \frac{P^{(l)}(f \mid z) P^{(l)}(t \mid z) P^{(l)}(z)}{\sum_{z \in z^{(l)}} P^{(l)}(f \mid z) P^{(l)}(t \mid z) P^{(l)}(z)}$$

Note that parameters "$P^{(1)}(f,z)$" and "$P^{(1)}(t,z)$" may refer to either common parameters "$P_c(f,z)$" and "$P_c(t,z)$" when "$z \in z_c$" or "$P_I^{(1)}(f,z)$" and "$P_I^{(1)}(t,z)$" if "$z \in z_I^{(l)}$", respectively.

An expected complete data log-likelihood may then be defined as follows:

$$\langle P \rangle = \sum_l \sum_{f,t} V_{f,t}^{(l)} \left\{ \sum_{z \in z_C} P^{(l)}(z \mid f, t) \log P_C(f \mid z) P_C(t \mid z) P^{(l)}(z) + \sum_{z \in z_I^{(l)}} P^{(l)}(z \mid f, t) \log P_I^{(l)}(f \mid z) P_I^{(l)}(t \mid z) P^{(l)}(z) \right\}.$$

With proper Lagrange multipliers that may be used to enforce parameter summation to one, the expected complete data log-likelihood may be maximized with the following update rules as M-step:

For "$z \in z_I^{(l)}$".

$$P_I^{(l)}(f \mid z) = \frac{\sum_t V_{f,t}^{(l)} P^{(l)}(z \mid f, t)}{\sum_{f,t} V_{f,t}^{(l)} P^{(l)}(z \mid f, t)},$$

$$P_I^{(l)}(t \mid z) = \frac{\sum_f V_{f,t}^{(l)} P^{(l)}(z \mid f, t)}{\sum_{f,t} V_{f,t}^{(l)} P^{(l)}(z \mid f, t)},$$

For "$z \in z_c$":

$$P_C(f \mid z) = \frac{\sum_{l,t} V_{f,t}^{(l)} P^{(l)}(z \mid f, t)}{\sum_{l,f,t} V_{f,t}^{(l)} P^{(l)}(z \mid f, t)},$$

$$P_C(t \mid z) = \frac{\sum_{l,f} V_{f,t}^{(l)} P^{(l)}(z \mid f, t)}{\sum_{l,f,t} V_{f,t}^{(l)} P^{(l)}(z \mid f, t)},$$

And, for "“z∈$z^{(l)}$”:

$$P^{(l)}(z) = \frac{\sum_{f,t} V_{f,t}^{(l)} P^{(l)}(z \mid f, t)}{\sum_{z,f,t} V_{f,t}^{(l)} P^{(l)}(z \mid f, t)}.$$

It should be noted that updates for "$P_c$(f|z)" and "$P_c$(t|z)" include summation over "l" to involve each of the reconstructions of the common components, i.e., "$v_{f,t}^{(l)}P^{(l)}$(z|f,t) where z∈$z_c$".

Incorporating Prior Knowledge

As previously described, prior knowledge may also be incorporated into the model. For example, a cleaner recording of a song recorded in a studio may be used as prior knowledge for the same song played in a live concert. However, the bases for those prior signals may not be simply learned and fixed as target parameters "$P_c$(f|z)" or "$P_I^{(1)}$(f|z)" in some instances as there is no guarantee that the signals from the prior source have the exact same spectral characters with components in the sound data to be analyzed.

Accordingly, the prior information may be used in the form of a MAP estimation in one or more implementations. First, the bases of the magnitude spectrograms are learned of the corresponding clean music signal and interference by directly applying PLCA update rules as described above. The learned bases vectors "$P_{source}$(f|Z)" and "$P_{interf}^{(l)}$(f|z)" may then be applied to the model to construct a new expected complete data log-likelihood, which may be expressed as follows:

$$\langle P \rangle = \sum_l \sum_{f,t} V_{f,t}^{(l)} \left\{ \begin{array}{l} \sum_{z \in z_C} \begin{pmatrix} P^{(l)}(z \mid f, t) \log P_C(f \mid z) P_C(t \mid z) P^{(l)}(z) + \\ \alpha P_{source}(f \mid z) \log P_C(f \mid z) \end{pmatrix} + \\ \sum_{z \in z_I^{(l)}} \begin{pmatrix} P^{(l)}(z \mid f, t) \log P_I^{(l)}(f \mid z) P_I^{(l)}(t \mid z) P^{(l)}(z) + \\ \beta P_{interf}^{(l)}(f \mid z) \log P_I^{(l)}(f \mid z) \end{pmatrix} \end{array} \right\},$$

where "α" and "β" are used to control an amount of influence of prior bases.

Once again, Lagange multipliers may be used to derive a final M-step priors, which is shown as follows:

For "z∈$z_I^{(l)}$":

$$P_I^{(l)}(f \mid z) = \frac{\sum_t V_{f,t}^{(l)} P^{(l)}(z \mid f, t) + \alpha P_{interf}^{(l)}(f \mid z)}{\sum_{f,t} V_{f,t}^{(l)} P^{(l)}(z \mid f, t) + \alpha P_{interf}^{(l)}(f \mid z)}$$

$$P_I^{(l)}(t \mid z) = \frac{\sum_f V_{f,t}^{(l)} P^{(l)}(z \mid f, t)}{\sum_{f,t} V_{f,t}^{(l)} P^{(l)}(z \mid f, t)},$$

For "z∈$z_c$":

$$P_C(f \mid z) = \frac{\sum_{l,t} V_{f,t}^{(l)} P^{(l)}(z \mid f, t) + \alpha P_{source}(f \mid z)}{\sum_{l,f,t} V_{f,t}^{(l)} P^{(l)}(z \mid f, t) + \alpha P_{source}(f \mid z)},$$

-continued $$P_C(t \mid z) = \frac{\sum_{l,f} V_{f,t}^{(l)} P^{(l)}(z \mid f, t)}{\sum_{l,f,t} V_{f,t}^{(l)} P^{(l)}(z \mid f, t)},$$

And, for "“z∈$z^{(l)}$”:

$$P^{(l)}(z) = \frac{\sum_{f,t} V_{f,t}^{(l)} P^{(l)}(z \mid f, t)}{\sum_{z,f,t} V_{f,t}^{(l)} P^{(l)}(z \mid f, t)}.$$

Figure 4:
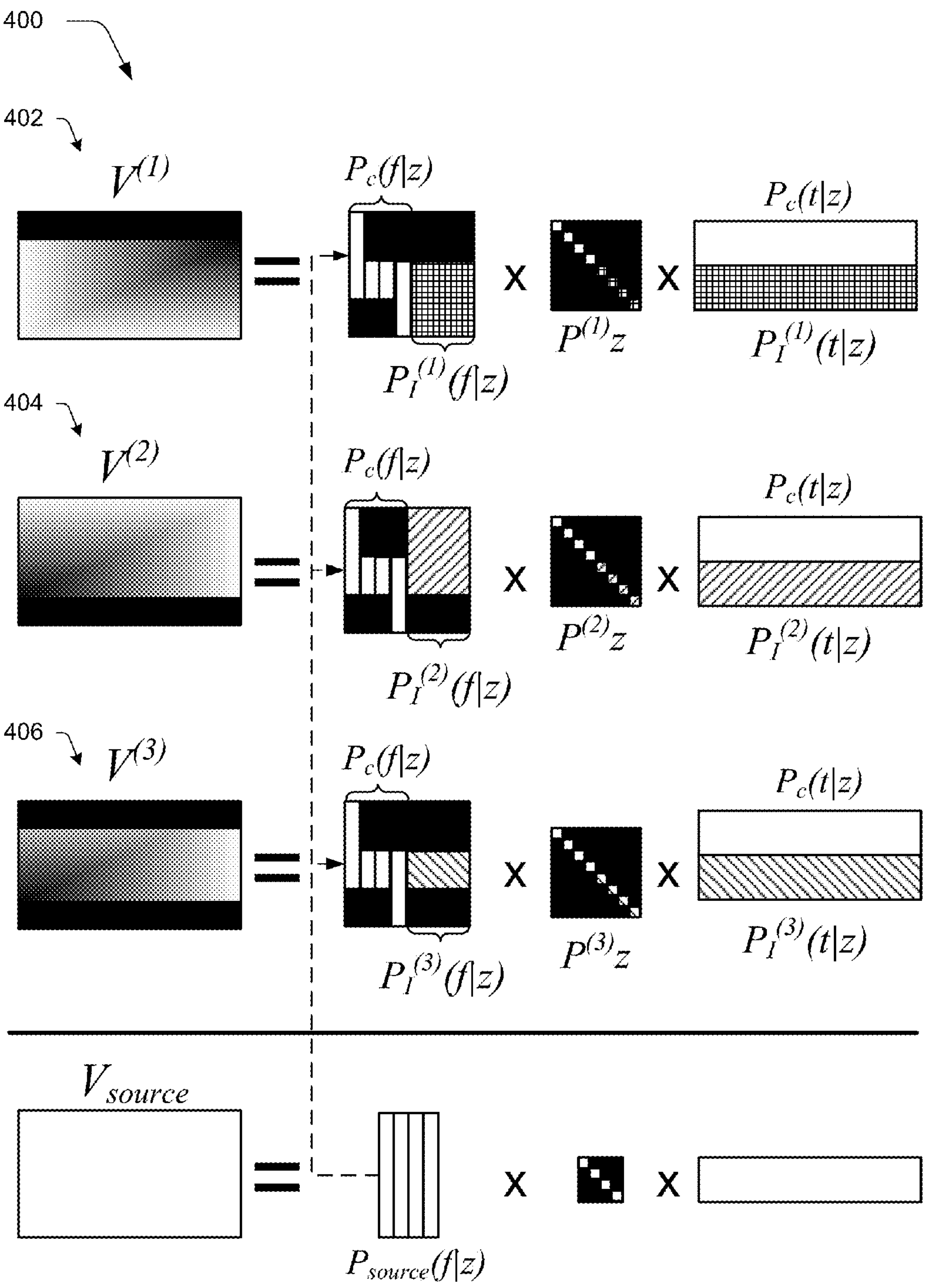
FIG. 4 depicts an example implementation in which a PLCS process is applied to three different inputs.

FIG. 4 depicts an example implementation 400 in which a PLCS process is applied to three different inputs. In the illustrated example, first, second, and third inputs 402, 404, 406 correspond to low pass filtered inputs, high pass filtered inputs, and both low and high pass filtered inputs, respectively.

Each of the inputs 402, 404, 406 include uncommon sound data 124 (e.g., additional artifacts) and thus are not common to each of the inputs. The uncommon sound data 124 may be captured as individual components and thus identified as separate from the common components. As shown by the dashed line, the learned bases vectors may be obtained from the common parameters.

To recover the magnitudes of the desired audio sources, the sum of the posterior probabilities of "z∈$z_c$" are multiplied to the input sound data 112 and 114 as follows:

$$\hat{S}_{f,t}^{(l)} = X_{f,t}^{(l)} \sum_{z \in z_C} P^{(l)}(z \mid f, t)$$

wherein $X_{f,t}^{(l)}$ is the "l-th" sound data of the full complex valued spectrogram, and $\hat{S}_{f,t}^{(l)}$ is the spectrogram of the separated source in the "l-th" input.

Compensation of Band Limited Reconstructions

Figure 5:
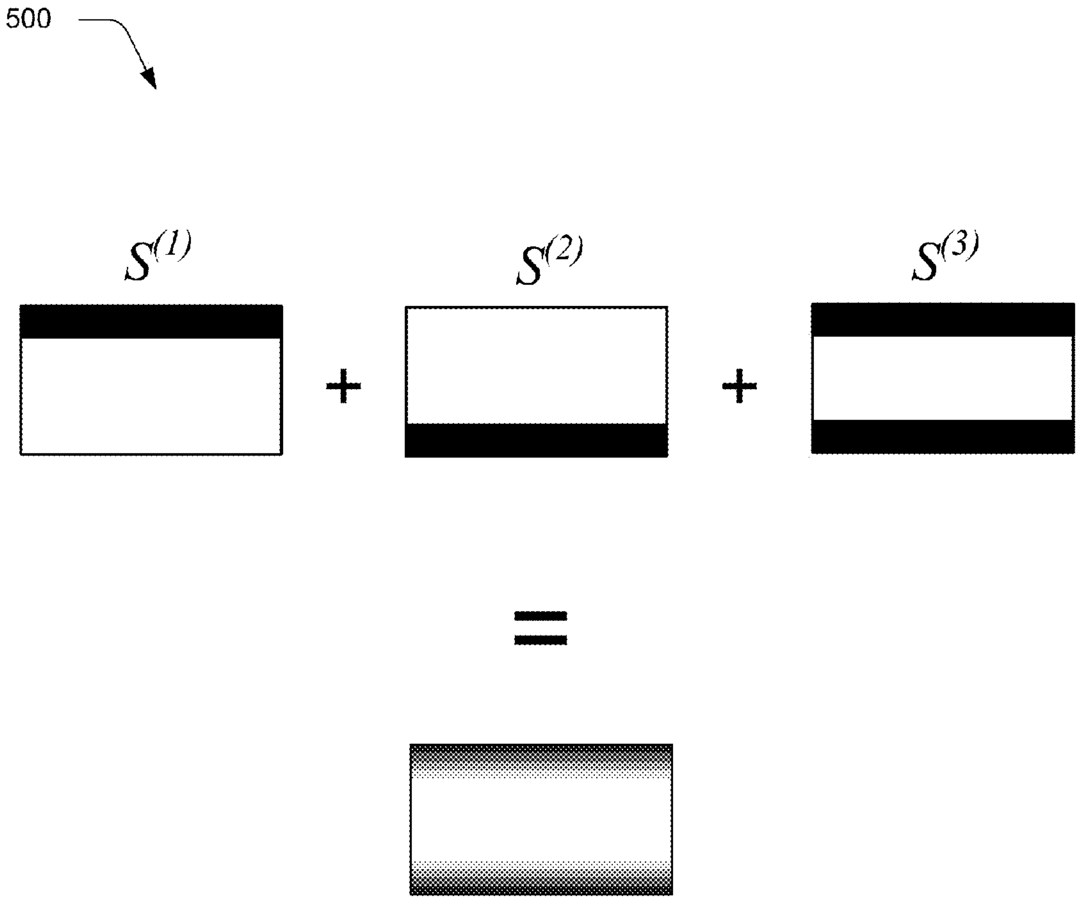
FIG. 5 depicts an example implementation showing an average of isolated sources that is limited by the band limited nature of the signals used to form the result.

As shown in the example implementation 400 in FIG. 4, instances may be encountered in which recorded signals have attenuated regions, such as in the high or lower frequency areas in comparison with middle frequency regions in the illustrated examples. This may be due to a variety of factors, such as use of sound capture devices that do not have flat frequency responses, signals could be coded using a process that employs low pass filtering in low bit rate modes, and so on. As shown in the example implementation 500 of FIG. 5, for instance, an average of isolated sources $S^{(1)}$, $S^{(2)}$, and $S^{(3)}$ is limited by the band limited nature of the signals used to form the result.

The post processing module 216, however, may employ collaborative techniques in post processing to address this issue. For example, although most of the recordings lost their high frequency area, it is possible that the rest of the recordings maintain this area in good spectral shape which can be utilized to generate processed sound data 126 that is enhanced.

For instance, suppose "L" recovered magnitude spectrograms 210 are obtained out of PLCS, which may be represented as follows:

$$|\hat{S}_{ft}^{(l)}|$$

The post processing may begin with calculating a normalized average spectrum of those reconstructions as follows:

$$y^{(l)} = \frac{\sum_t |\hat{S}_{ft}^{(l)}|}{\sum_{ft} |\hat{S}_{ft}^{(l)}|}.$$

Global weights may then be drawn out of the normalized average spectra by considering differences among recordings in each particular frequency bin. The global weights are defined as follows:

$$w_f = \frac{\sum_l y_f^{(l)}}{\max_l y_f^{(l)}}.$$

For example, for a middle frequency bin "$f_m$" where each of the reconstructions have the similar normalized average energy as follows:

$$y_{fm}^{(1)} \approx y_{fm}^{(2)} \approx y_{fm}^{(3)} \approx \ldots \approx y_{fm}^{(L)}$$

the global weight "$w_{fm} \approx L$," which lets the compensation process be implemented as an ordinary average. However, an instance may be encountered in which two out of three recordings are low pass filtered at a high frequency bin "$f_h$" while the other was not, so that $y_{fh}^{(l)}$ have values such as:

$y_{fh}^{(1)}=0.001$ $y_{fh}^{(2)}=0.001$ $y_{fh}^{(3)}=0.008$.

Figure 6:
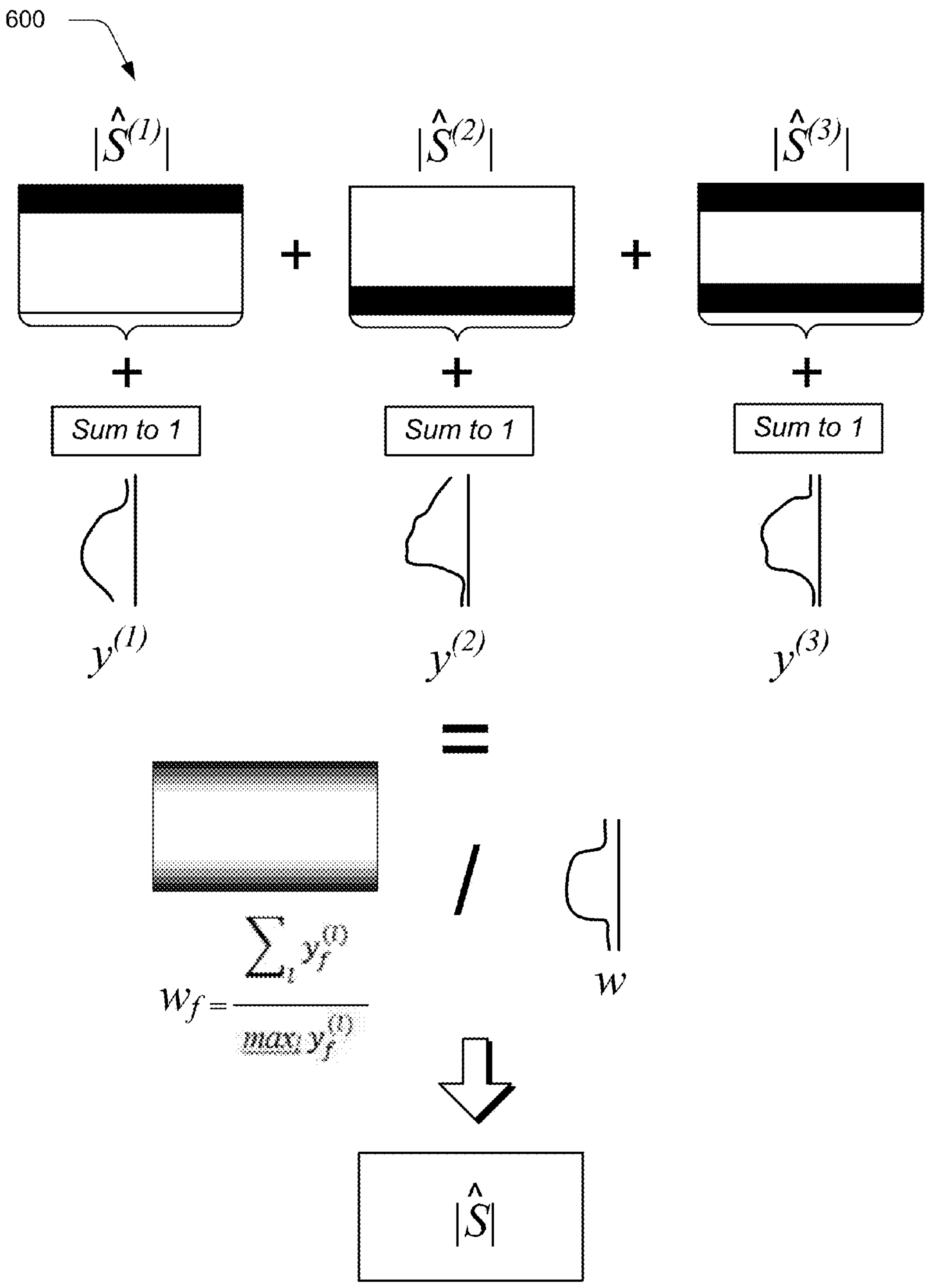
FIG. 6 depicts an example of the post processing in terms of three band-limited reconstructions which can be regarded as the output of FIG. 4.

Hence, "$w_{fh}$" has the value 0.01/0.008=1.25, which is a lot less than L=3 (which is a maximum possible weight), and in turn boosts up the attenuated reconstruction at "fh" by dividing:

$$\Sigma_t \hat{S}_{f,t}^{(l)}$$

with 1.25 than 3, the maximum possible weight. FIG. 6 depicts an example 600 of the post processing in terms of three band-limited reconstructions which can be regarded as the output of FIG. 4.

Example Procedures

The following discussion describes sound data identification techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
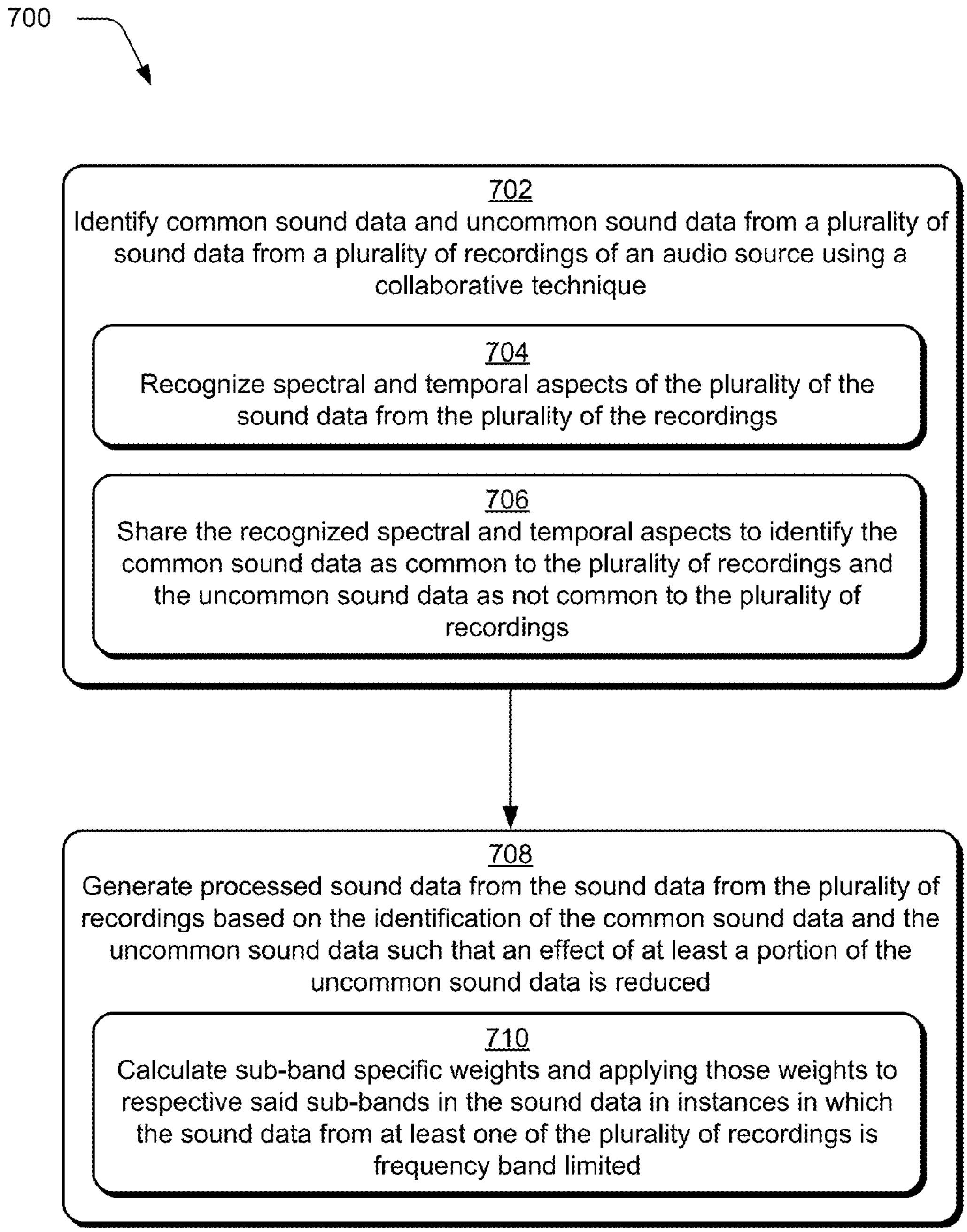
FIG. 7 is a flow diagram depicting a procedure in an example implementation in which sound data is identified and processed.

FIG. 7 depicts a procedure 700 in an example implementation in which common and uncommon sound data are identified and used to generated processed sound data. Common sound data and uncommon sound data are identified from a plurality of sound data from a plurality of recordings of an audio source using a collaborative technique (block 702). The recordings, for instance, may be captured simultaneously from a single audio source, such as a lecture, live event, concert, and so on. Thus, the recordings may be temporality synchronized to each other.

The collaborative technique may include recognition of spectral and temporal aspects of the plurality of sound data from the plurality of the recordings (block 704). These aspects are then shared to identify the common sound data as common to the plurality of recordings and the uncommon sound data as not common to the plurality of recordings (block 706). In this way, an intuition may be leveraged that common sound data shares both frequency and time characteristics, whereas uncommon sound data does not. This identification may be leveraged to support a variety of functionality.

For example, processed sound data may be generated from the sound data form the plurality of recordings based on the identification of the common sound data and the uncommon sound data such that an effect of at least a portion of the uncommon sound data is reduced (block 708). This may include extracting the uncommon sound data such that it is not included in the processed sound data. The generation may also be performed to leverage a collaborative technique, such as to calculate sub-band specific weights and apply those weights to respective said sub-bands in the sound data in instances in which the sound data from at least one of the plurality of recordings is frequency-band limited (block 710) as shown in FIG. 6.

Example System and Device

Figure 8:
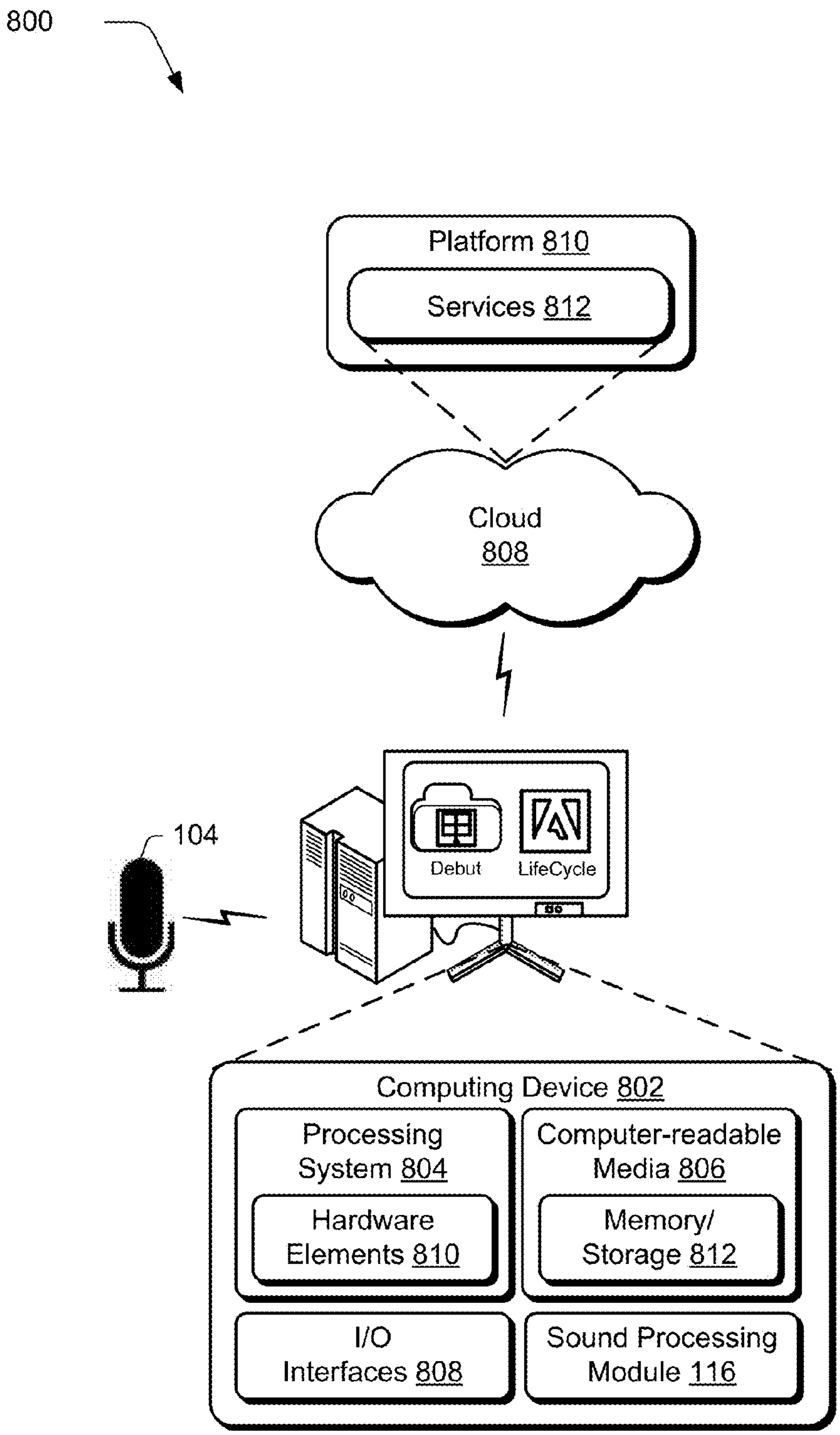
FIG. 8 illustrates an example system including various components of an example device that can be implemented as any type of computing device as described with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the sound processing module 116, which may be configured to process sound data, such as sound data captured by an sound capture device 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

identifying common sound data and uncommon sound data by a computing device from a plurality of sound data from a plurality of recordings of an audio source using a collaborative technique comprising:

recognizing spectral and temporal aspects of the plurality of the sound data by the computing device from the plurality of the recordings; and sharing the recognized spectral and temporal aspects by the computing device to identify the common sound data as common to the plurality of recordings and the uncommon sound data that comprises noise of a particular one of the plurality of recordings as not common to the plurality of recordings; and controlling generation of processed sound data that is output for listening, the processed sound data generated from the sound data from the plurality of recordings based on the identification of the common sound data and the uncommon sound data.

2. A method as described in claim 1, wherein the recognizing and the sharing are performed using probabilistic latent component analysis (PLCA).

3. A method as described in claim 2, wherein the PLCA is configured to perform the recognizing by decomposing the sound data into a predefined number of components, each of which is further factorized into a spectral basis vector, a temporal excitation, and a weight for the component to recognize the spectral and temporal aspects of the plurality of the sound data from the plurality of the recordings, respectively.

4. A method as described in claim 3, wherein the sound data is in a form of input matrices having an index of time and frequency positions for a particular said recording.

5. A method as described in claim 1, further comprising generating the processed sound data from the sound data from the plurality of recordings based on the identification of the common sound data and the uncommon sound data such that an effect of at least a portion of the uncommon sound data is reduced.

6. A method as described in claim 5, wherein the generating includes generating the processed sound data without at least a portion of the uncommon sound data.

7. A method as described in claim 5, wherein the generating further comprises calculating sub-band specific weights and applying those weights to respective said sub-bands in the sound data in instances in which the sound data from at least one of the plurality of recordings is frequency band limited.

8. A method as described in claim 1, wherein the plurality of sound data is in a form of time-frequency representations.

9. A method as described in claim 8, wherein the time-frequency representations are calculated as short-time Fourier transforms.

10. A method as described in claim 1, wherein the sound data from the plurality of recordings are configured as magnitude spectrograms.

11. A method as described in claim 1, wherein the plurality of recordings are captured from a single said audio source, simultaneously.

12. A method as described in claim 1, wherein the plurality of sound data from the plurality of recordings is temporally synchronized, one to another.

13. A method as described in claim 1, wherein the recognizing leverages prior knowledge of the audio source.

14. One or more computer-readable storage media having instructions stored thereon that, responsive to execution by a computing device, causes the computing device to perform operations comprising:

identifying common sound data and uncommon sound data from a plurality of sound data from a plurality of recordings of an audio source using a collaborative technique that identifies the common sound data as common to the plurality of recordings and the uncommon sound data that comprises noise of a particular one of the plurality of recordings as not common to the plurality of recordings; and generating processed sound data from the sound data from the plurality of recordings based on the identification of the common sound data and the uncommon sound data such that an effect of at least a portion of the uncommon sound data is reduced.

15. One or more computer-readable storage media as described in claim 14, wherein the generating includes generating the processed sound data without at least a portion of the uncommon sound data.

16. One or more computer-readable storage media as described in claim 14, wherein the generating includes calculating sub-band specific weights and applying those weights to respective said sub-bands in the sound data in instances in which the sound data from at least one of the plurality of recordings is frequency band limited.

17. One or more computer-readable storage media as described in claim 14, wherein the collaborative technique shares spectral and temporal aspects that are recognized from the plurality of the sound data from the plurality of recordings to identify the common sound data as common to the plurality of recordings and the uncommon sound data as not common to the plurality of recordings.

18. A system comprising:

one or more modules implemented at least partially in hardware and configured to generate a time-frequency representation of sound data from a plurality of recordings of an audio source that is temporally synchronized, one to another, and identify common and uncommon sound data using a collaborative technique that identifies the common sound data as common to the plurality of recordings and the uncommon sound data that comprises noise of a particular one of the plurality of recordings as not common to the plurality of recordings; and at least one module implemented at least partially in hardware and configured to generate processed sound data that is output for listening from the sound data from the plurality of recordings based on the identification of the common sound data and the uncommon sound data.

19. A system as described in claim 18, wherein the at least one module is configured to generate the processed sound data by calculating sub-band specific weights and applying those weights in instances in which the sound data from at least one of the plurality of recordings is frequency band limited.

20. A system as described in claim 19, wherein the collaborative technique of the one or more modules includes sharing spectral and temporal aspects recognized from the plurality of sound data from the plurality of recordings to identify the common sound data as common to the plurality of recordings and the uncommon sound data as not common to the plurality of recordings.

* * * * *